F. O. ROLLINS.
COOKING UTENSIL.
APPLICATION FILED APR. 27, 1910.
974,828.
Patented Nov. 8, 1910.
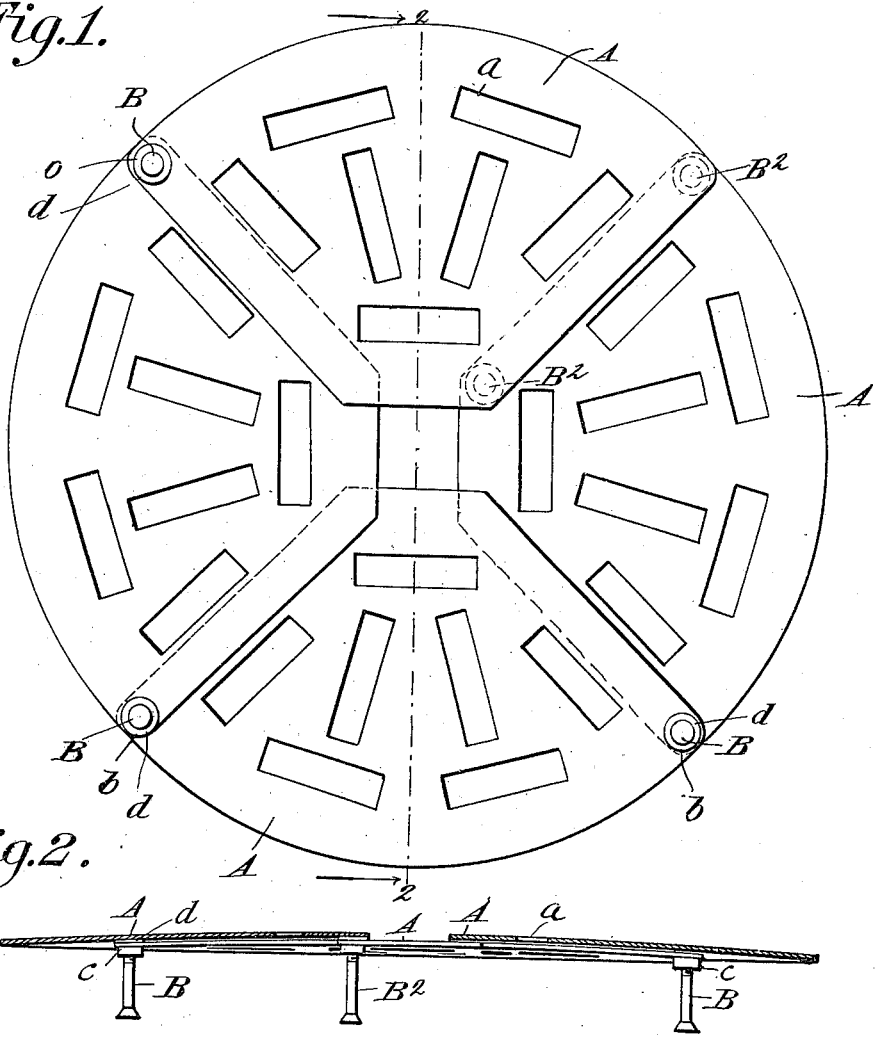
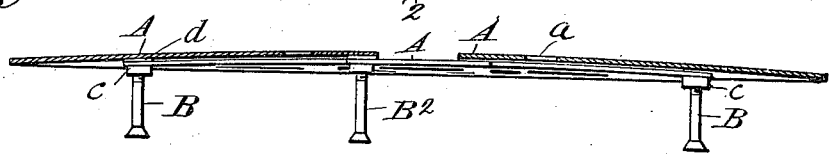
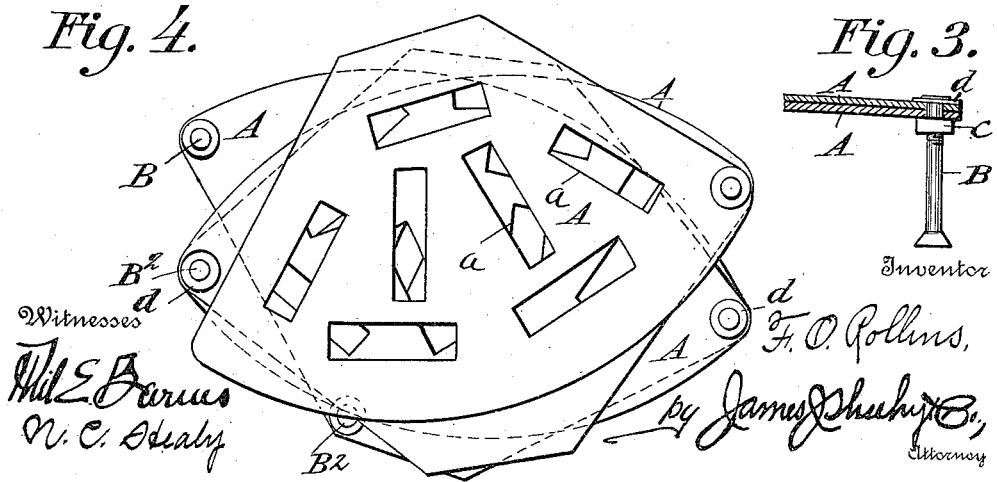
Inventor
F. O. Rollins,
by James & Shuehy & Co.,
Attorney
Witnesses

UNITED STATES PATENT OFFICE.

FRANK OSCAR ROLLINS, OF LAKEPORT, NEW HAMPSHIRE, ASSIGNOR OF ONE-HALF TO EDGAR SAMUEL HODGDON, OF LAKEPORT, NEW HAMPSHIRE, AND ONE-HALF TO BENJAMIN JAMES SMITH, OF LACONIA, NEW HAMPSHIRE.

COOKING UTENSIL.

974,828.

Specification of Letters Patent. Patented Nov. 8, 1910.

Application filed April 27, 1910. Serial No. 558,042.

*To all whom it may concern:*

Be it known that I, FRANK OSCAR ROLLINS, a citizen of the United States, residing at Lakeport, in the county of Belknap and State of New Hampshire, have invented new and useful Improvements in Cooking Utensils, of which the following is a specification.

My present invention has to do with cooking utensils; and it has for its object to provide an adjustable support designed primarily for use in square or round pans or kettles or other vessels with a view to supporting meats, fish, puddings and the like above the bottom of a vessel during the cooking operation and in that way facilitate the cooking and prevent burning of the article that is being cooked.

My invention will be best understood by reference to the following description when taken in connection with the accompanying illustration of one specific embodiment thereof, while its scope will be more particularly pointed out in the appended claim.

In the drawings which are hereby made a part hereof: Figure 1 is a plan showing my novel support as adjusted for use in a circular cooking vessel or for use as a broiler over an opening in a stove top. Fig. 2 is a diametrical section taken in the plane indicated by the line 2—2 of Fig. 1, looking in the direction indicated by arrow. Fig. 3 is an enlarged detail section illustrative of the manner in which I prefer to pivotally connect the body sections of the support together and to the legs comprised in the support. Fig. 4 is a plan view illustrating the support as folded compactly to adapt it for use as a sad-iron stand.

Similar letters designate corresponding parts in all of the views of the drawings, referring to which:

A A are the body sections of my novel support, and B B are the legs thereof. The body sections A are preferably formed of suitable sheet-metal, though they may be formed of any other material consonant with the purpose of my invention without involving departure from the scope of the same as claimed. Each of the said sections A is preferably of general sector shape—*i. e.*, has the shape of a sector the vertex of which is removed, and each is provided with a plurality of apertures $a$, this in order to permit of the free passage of steam or products of combustion upward through the body of the support. The several sections A are preferably lapped after the manner illustrated in Figs. 1 and 2, and are pivotally connected together at the three points $b$ through the medium of three of the legs B and nuts $c$ and washers $d$ thereon, as best shown in Figs. 2 and 3. It will also be noted by reference to Fig. 1, that one of the end sections A is provided with two legs $B^2$, and is designed to rest under but is not connected to the adjoining end of the other end section A.

In the practical use of my novel support for the purpose of holding a piece of meat or other article to be cooked above the bottom of a cooking vessel, the support is first opened to the extent necessary to suit it to the shape and size of the vessel, and is then placed in the vessel with its legs B $B^2$ resting on the bottom thereof, or if preferred, the support may be adjusted as to size after being placed in the vessel. Then when water is placed in the bottom of the vessel and the article to be cooked is superposed on the support, it will be manifest that the support will prevent burning of the article that is being cooked, and at the same time will permit the free passage of steam upward and in that way will contribute to the expeditious and thorough cooking of the article.

It will be gathered from the foregoing that the pivotal connection of the body sections A in series permits of each of said sections being readily swung upon the adjoining section, and also permits of the support as a whole being quickly and easily adjusted as to shape and size in the manner before described. This latter will be better appreciated when it is borne in mind that the end sections are not directly connected together, and that therefore one end section may be adjusted bodily on the other and all of the sections may be adjusted relative to each other to a great extent to adapt the device for use in a large or small vessel, of circular form in horizontal section, or in a vessel of rectangular form in horizontal section.

Notwithstanding the utility of my novel support as pointed out in the foregoing, it will be noticed that the support is simple and inexpensive in construction and that as a whole it is well adapted to withstand the rough usage to which cooking utensils or cooking stove adjuncts are ordinarily subjected.

While I have shown and described one form of my invention, it is to be understood that I am not limited to the details or the form or relative arrangement of parts disclosed, but that modifications may be made therein without departing from the spirit thereof.

Having described my invention, what I claim and desire to secure by Letters-Patent, is:

A support for the purpose described, comprising a plurality of sector-shaped sections, of even thickness throughout, lapped and pivotally connected end to end in series and at points adjacent their outer edges; the outer ends of the end sections being disconnected and lapped and free to move bodily one on the other, and legs connected with and depending from the sections.

In testimony whereof I have hereunto set my hand in presence of two subscribing witnesses.

FRANK OSCAR ROLLINS.

Witnesses:
   FLORENCE PLUMMER,
   GUY B. COX.